United States Patent
Li et al.

(10) Patent No.: US 12,341,461 B2
(45) Date of Patent: Jun. 24, 2025

(54) ELECTRIC TOOL AND THREE-PHASE ELECTRIC MOTOR CONTROL DEVICE AND METHOD THEREOF

(71) Applicant: Bosch Power Tools (China) Co., Ltd., Hangzhou (CN)

(72) Inventors: Shupei Li, Hangzhou (CN); Mengsi Ye, Hangzhou (CN)

(73) Assignee: Robert Bosch GmbH, Stuttgart (DE)

( * ) Notice: Subject to any disclaimer, the term of this patent is extended or adjusted under 35 U.S.C. 154(b) by 184 days.

(21) Appl. No.: 18/252,990

(22) PCT Filed: Nov. 16, 2020

(86) PCT No.: PCT/CN2020/128935
§ 371 (c)(1),
(2) Date: May 15, 2023

(87) PCT Pub. No.: WO2022/099669
PCT Pub. Date: May 19, 2022

(65) Prior Publication Data
US 2024/0030844 A1    Jan. 25, 2024

(51) Int. Cl.
*H02P 6/24* (2006.01)
*B25F 5/00* (2006.01)
*H02P 6/28* (2016.01)

(52) U.S. Cl.
CPC ............ *H02P 6/24* (2013.01); *H02P 6/28* (2016.02); *B25F 5/00* (2013.01)

(58) Field of Classification Search
CPC ............... H02P 6/24; H02P 6/28; B25F 5/00
See application file for complete search history.

(56) References Cited

U.S. PATENT DOCUMENTS

| | | | | |
|---|---|---|---|---|
| 11,716,037 B2 * | 8/2023 | Yang | ........................ | H02P 6/182 318/400.35 |
| 11,750,124 B2 * | 9/2023 | Waikar | ....................... | H02P 6/17 318/400.01 |
| 2012/0019177 A1 | 1/2012 | Kaufmann et al. | | |

FOREIGN PATENT DOCUMENTS

| | | |
|---|---|---|
| CN | 103248295 A | 8/2013 |
| CN | 103427735 A | 12/2013 |

(Continued)

OTHER PUBLICATIONS

International Search Report corresponding to PCT Application No. PCT/CN2020/128935, mailed Aug. 12, 2021 (Chinese and English language document) (6 pages).

*Primary Examiner* — Zoheb S Imtiaz
(74) *Attorney, Agent, or Firm* — Maginot, Moore & Beck LLP

(57) ABSTRACT

An electric tool, a control device and a method for a three-phase motor thereof is disclosed. The control device includes a switching unit that has a first switching unit and a second switching unit. The first switching unit and the second switching unit each includes a plurality of switching elements corresponding to respective phases of a driving circuit of the three-phase motor. The respective switching element of the first switching unit are connected in series with corresponding switching elements of the second switching unit, respectively. The control unit further includes a control unit configured to be electrically connected to the switching unit and to generate a first control signal for controlling switching states of the respective switching elements so as to realize a first brake mode of the three-phase motor. Under the control of the first control signal, the respective switching elements of the first switching unit are turned off, and in each sub-period interval of one electrical period, the switching element in the second (Continued)

switching unit corresponding to a phase with a maximum back electromotive force of the three-phase motor is turned off, and the other switching elements in the second switching unit are turned on.

13 Claims, 4 Drawing Sheets

(56) References Cited

FOREIGN PATENT DOCUMENTS

| | | |
|---|---|---|
| CN | 106553162 A | 4/2017 |
| CN | 111602330 A | 8/2020 |

\* cited by examiner

ELECTRIC TOOL AND THREE-PHASE ELECTRIC MOTOR CONTROL DEVICE AND METHOD THEREOF

This application is a 35 U.S.C. § 371 National Stage Application of PCT/CN2020/128935, filed on Nov. 16, 2020, the disclosure of which is incorporated herein by reference in its entirety.

The present application generally relates to the technical field of motor control, and in particular to a control device for a motor used in an electric tool, an electric tool comprising the control device, and a corresponding control method.

BACKGROUND

Three-phase motors are widely used in electric tools, and they convert electrical energy into mechanical energy, so as to provide the electric tools with driving force. In the process of a three-phase motor entering from a running state to a braking state until it is stopped by braking, the operating energy in the motor needs to be consumed, which is realised through a motor braking scheme. An existing motor braking scheme usually uses a power switching device and a capacitor to consume motor energy. However, the existing motor braking scheme has the problem that there is energy returning to a battery or power supply of the electric tool.

According to the existing motor braking scheme, for a typical electric tool, i.e., a DC-EC wireless electric tool, it uses a battery as a power supply. The DC-EC wireless electric tool tends to frequently perform a start operation and a stop operation, which requires frequent starting and stopping of a motor therein. The life of the battery is greatly reduced when the motor brakes frequently and thus there is high energy frequently returning to the battery during braking.

According to the above existing motor braking scheme, for another typical electric tool, i.e., an AC-EC corded electric tool, it is usually implemented in a miniaturized size, which limits the use of a large-sized capacitor therein. In the case that a small-sized capacitor is used, the capacitor usually has a small capacity. Thus, only limited motor energy can be consumed, and there is still high energy returned to the power supply of the electric tool, thereby damaging the electric tool or a power switch therein.

Therefore, there is an urgent need for a technical solution that overcomes above defects.

SUMMARY

The following brief introduction is provided to introduce selected concepts in a simplified form, and these concepts will be further described in the subsequent detailed description. The brief introduction is not intended to highlight key or essential features of the claimed subject matter, nor is it intended to limit the scope of the claimed subject matter.

According to a first aspect of the present disclosure, a control device for a three-phase motor used in an electric tool is provided. The control device comprises: a switching unit configured to comprise a first switching unit and a second switching unit, wherein the first switching unit and the second switching unit each comprises a plurality of switching elements corresponding to respective phases of a driving circuit of the three-phase motor, each switching element of the first switching unit is connected in series with a corresponding switching element of the second switching unit, and both are separately electrically connected to one phase of the driving circuit of the three-phase motor; and a control unit configured to be electrically connected to the switching unit, and to generate a first control signal for controlling switching states of the respective switching elements, so as to realise a first brake mode of the three-phase motor, wherein under the control of the first control signal, the respective switching elements of the first switching unit are turned off, and in each sub-period interval of one electrical period, the switching element in the second switching unit corresponding to a phase with a maximum back electromotive force of the three-phase motor is turned off, and the other switching elements in the second switching unit are turned on.

According to a feasible implementation, each electrical period comprises six sub-periods, and in each electrical period in the first brake mode, under the control of the first control signal: in first and sixth sub-period intervals, the switching element in the second switching unit corresponding to phase U is turned off, and the switching elements in the second switching unit corresponding to phases V and W are turned on; in second and third sub-period intervals, the switching element in the second switching unit corresponding to phase V is turned off, and the switching elements in the second switching unit corresponding to phases U and W are turned on; in fourth and fifth sub-period intervals, the switching element in the second switching unit corresponding to phase W is turned off, and the switching elements in the second switching unit corresponding to phases U and V are turned on.

According to a feasible implementation, each of the six sub-periods is an interval of 60°.

According to a feasible implementation, the control unit is further configured to: during a period from when the first brake mode is executed for a certain duration so that operating energy of the three-phase motor is consumed by a predetermined percentage until the three-phase motor is stopped by braking, generate a second control signal for controlling the switching states of the respective switching elements, so as to realise a second brake mode of the three-phase motor, wherein under the control of the second control signal, the respective switching elements of the first switching unit are turned off, and the respective switching elements of the second switching unit are periodically turned on, or are always on.

According to a feasible implementation, the control unit is further configured to, before the first brake mode is executed, generate a third control signal for controlling the switching states of the respective switching elements so as to realise a third brake mode of the three-phase motor, and the first brake mode is executed again after the third brake mode is executed for a certain duration so that a return current to a bus is reduced to a predetermined threshold, wherein under the control of the third control signal, the respective switching elements of the first switching unit are turned off, and in each sub-period interval of one electrical period, the switching element in the second switching unit corresponding to one phase of the motor is turned on, and the switching elements in the second switching unit corresponding to the other two phases are turned off.

According to a feasible implementation, the control unit is further configured to set a leading conduction angle for a switching element to be turned on in the second switching unit, the leading conduction angle being greater than 0° and less than or equal to 60°.

According to a feasible implementation, the control unit is configured to determine one or more of first to third brake modes to be used according to a braking requirement of the three-phase motor in a practical application, and to determine an execution duration and an execution sequence of the used brake mode; the braking requirement comprises one or more of a braking current, a return bus current, and a braking duration; and the first braking mode is a dual down tube braking mode, the second braking mode is a maximum braking current mode, and the third braking mode is a single down tube braking mode.

According to a second aspect of the present disclosure, a control device for a three-phase motor used in an electric tool is provided. The control device comprises: a switching unit configured to comprise a first switching unit and a second switching unit, wherein the first switching unit and the second switching unit each comprises a plurality of switching elements corresponding to respective phases of a driving circuit of the three-phase motor, each switching element of the first switching unit is connected in series with a corresponding switching element of the second switching unit, and both are separately electrically connected to one phase of the driving circuit of the three-phase motor; and a control unit (22) configured to be electrically connected to the switching unit, and to generate a first control signal for controlling switching states of the respective switching elements, so as to realise a first brake mode of the three-phase motor, wherein each electrical period comprises six sub-periods, and in each electrical period in the first brake mode, under the control of the first control signal: the respective switching elements of the first switching unit are turned off; in first and sixth sub-period intervals, the switching element in the second switching unit corresponding to phase U is turned off, and the switching elements in the second switching unit corresponding to phases V and W are turned on; in second and third sub-period intervals, the switching element in the second switching unit corresponding to phase V is turned off, and the switching elements in the second switching unit corresponding to phases U and W are turned on; in fourth and fifth sub-period intervals, the switching element in the second switching unit corresponding to phase W is turned off, and the switching elements in the second switching unit corresponding to phases U and V are turned on.

According to a feasible implementation, each of the six sub-periods is an interval of 60°.

According to a third aspect of the present disclosure, an electric tool is provided. The electric tool comprises: a three-phase motor; and the control device as described above in the first or second aspect electrically connected to the three-phase motor, and comprising a switching unit and a control unit, wherein the control unit generates a control signal for controlling respective switching elements of the switching unit, so that the three-phase motor realises one or more of first to third brake modes, wherein the first brake mode is a dual down tube brake mode, the second brake mode is a maximum braking current mode or a PWM chopping brake mode, and the third brake mode is a single down tube brake mode.

According to a fourth aspect of the present disclosure, a control method for a three-phase motor used in an electric tool is provided. Optionally, the method is implemented in the control device as described in the first aspect and/or the electric tool as described in the third aspect, wherein the electric tool comprises a three-phase motor and a switching unit; the switching unit is electrically connected to the motor to supply a current thereto; the switching unit comprise a first switching unit and a second switching unit; the first switching unit and the second switching unit each comprises a plurality of switching elements corresponding to respective phases of a driving circuit of the three-phase motor; each switching element of the first switching unit is connected in series with a corresponding switching element of the second switching unit, and both are separately electrically connected to one phase of the driving circuit of the three-phase motor. The method comprises: generating a first control signal for controlling switching states of the respective switching elements, so as to realise a first braking mode of the three-phase motor, wherein under the control of the first control signal, the respective switching elements of the first switching unit are turned off, and in each sub-period interval of an electrical period, the switching element in the second switching unit corresponding to a phase with a maximum back electromotive force of the three-phase motor is turned off, and the other switching elements in the second switching unit are turned on.

According to a fifth aspect of the present disclosure, a control method for a three-phase motor used in an electric tool is provided. Optionally, the method is implemented in the control device as described in the second aspect and/or the electric tool as described in the third aspect, wherein the electric tool comprises a three-phase motor and a switching unit; the switching unit is electrically connected to the motor to supply a current thereto; the switching unit comprise a first switching unit and a second switching unit; the first switching unit and the second switching unit each comprises a plurality of switching elements corresponding to respective phases of a driving circuit of the three-phase motor; each switching element of the first switching unit is connected in series with a corresponding switching element of the second switching unit, and both are separately electrically connected to one phase of the driving circuit of the three-phase motor. The method comprises: generating a first control signal for controlling switching states of the respective switching elements, so as to realise a first brake mode of the three-phase motor, wherein each electrical period comprises six sub-periods, and in each electrical period in the first brake mode, under the control of the first control signal: the respective switching elements of the first switching unit are turned off; in first and sixth sub-period intervals, the switching element in the second switching unit corresponding to phase U is turned off, and the switching elements in the second switching unit corresponding to phases V and W are turned on; in second and third sub-period intervals, the switching element in the second switching unit corresponding to phase V is turned off, and the switching elements in the second switching unit corresponding to phases U and W are turned on; in fourth and fifth sub-period intervals, the switching element in the second switching unit corresponding to phase W is turned off, and the switching elements in the second switching unit corresponding to phases U and V are turned on.

DETAILED DESCRIPTION

Considering that the existing technical solutions cannot prevent the motor used in the electric tool from returning the energy of the battery/power source of the electric tool during the braking process, an embodiment of the present disclosure proposes an improved motor braking control solution, which has good performance in terms of expecting a high braking efficiency (e.g. a high braking current and a short braking duration) and expecting a current returned to the power supply/battery of the electric tool to be almost zero.

The braking control solution according to the embodiment of the present disclosure is applicable to various types of three-phase motors, for example, a three-phase motor with a back electromotive force waveform that may be a sine wave, a triangular wave, a trapezoidal wave or the like.

Specific implementations of the present disclosure will be described below with reference to the drawings.

Figure 1:
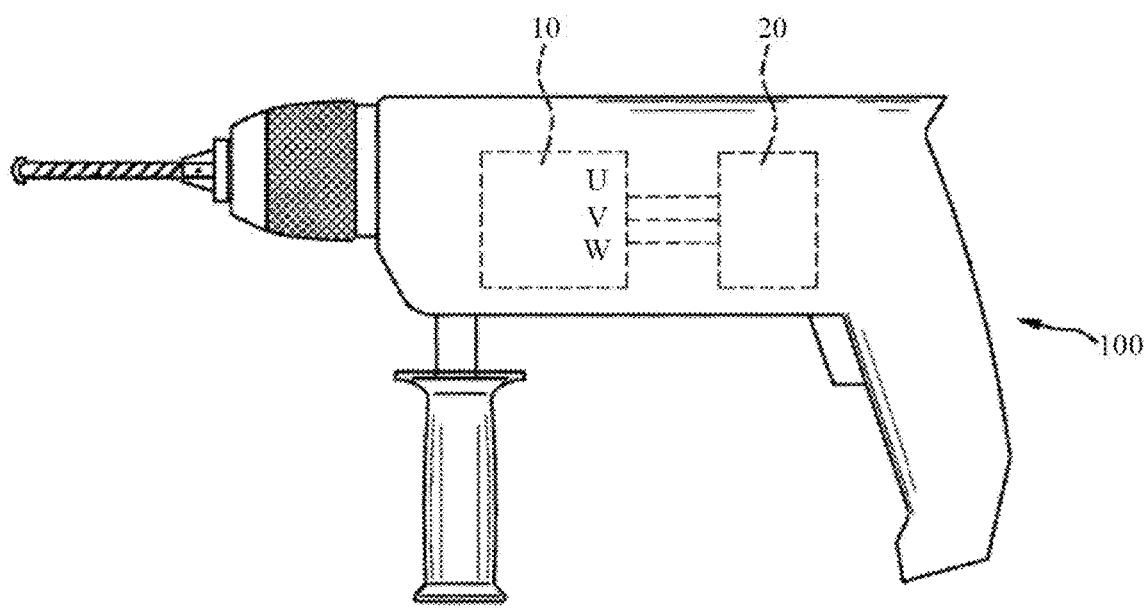
FIG. 1 shows a schematic diagram of an electric tool according to a feasible implementation of the present disclosure.

FIG. 1 schematically shows an electric tool 100 according to a feasible implementation of the present invention disclosure. The electric tool 100 mainly comprises a three-phase motor 10 and a control device 20.

The three-phase motor 10 is disposed inside a housing of the electric tool 100. The three-phase motor 10 serves as a driving component of the electric tool 100 and provides the electric tool 100 with driving force after being powered on. The three-phase motor 10 is, for example, a three-phase DC brushless motor.

The control device 20 is disposed inside the housing of the electric tool 100 and is electrically connected to the three-phase motor 10. The control device 20 mainly comprises a switching unit 21 and a control unit 22.

Figure 2:
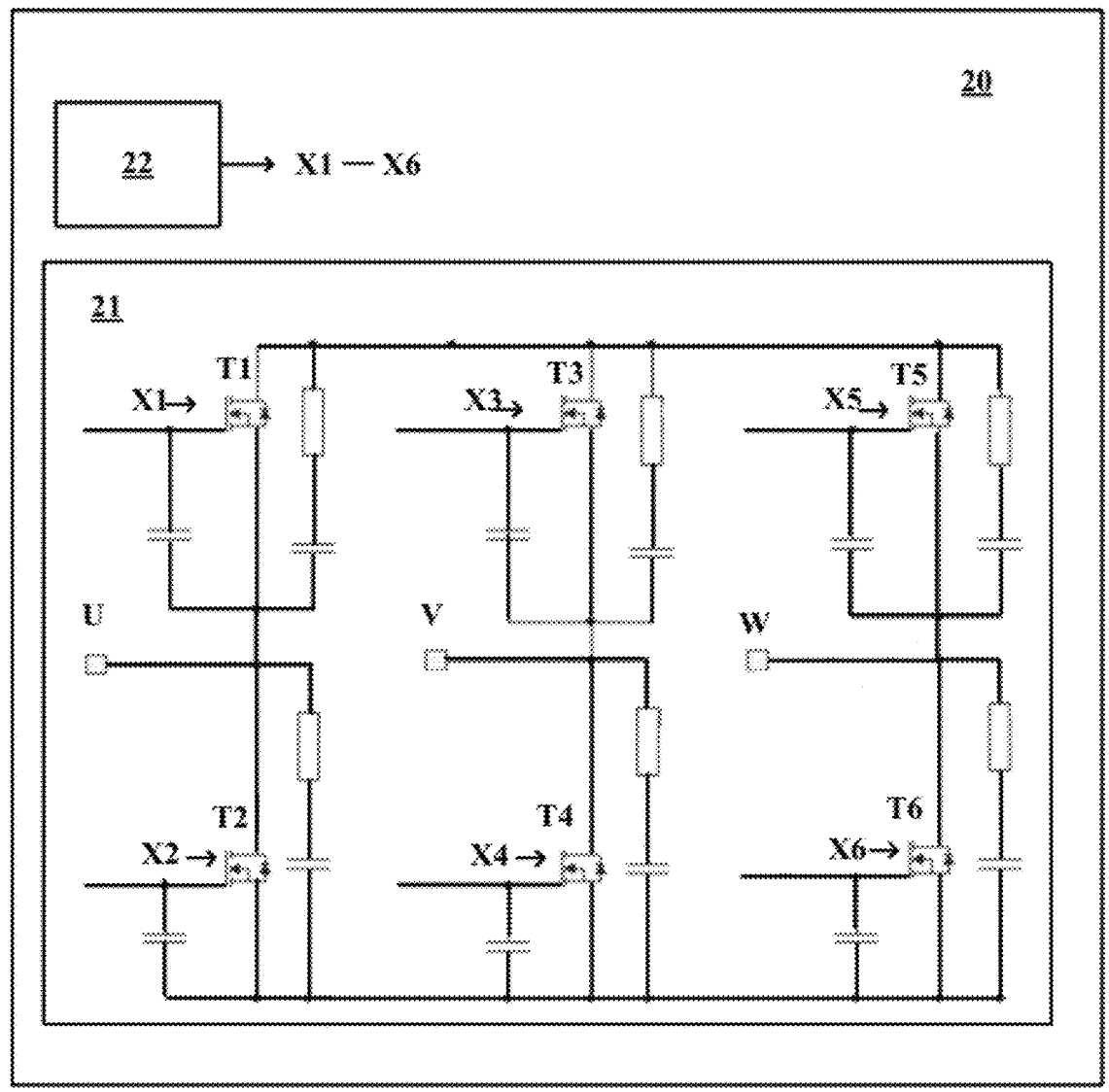
FIG. 2 shows an implementation of a control device for the electric tool in FIG. 1.

Referring to FIG. 2, the switching unit 21 is connected between a power supply of the motor 10 and the motor, and is used for allowing or disabling a power supply current to be output to the motor. The switching unit 21 may comprise a plurality of switching elements, and the plurality of switching elements may form a bridge inverter. The switching unit 21 may be a part of a driving circuit of the three-phase motor 10. For example, the driving circuit of the motor 10 comprises a plurality of switching elements of the switching unit to form an inverter circuit, and also comprises a boost circuit, a filter circuit, and the like.

In an embodiment, the switching unit 21 comprises six switching elements T1 to T6 to form a three-phase bridge inverter. Every two switching elements T1 and T2, T3 and T4, and T5 and T6 are connected in series. The connection points between the switching elements T1 and T2, T3 and T4 and T5 and T6 are each electrically conductively connected to one phase of the three-phase motor 10. For example, the connection point between the switching elements T1 and T2 is electrically conductively connected to phase U; the connection point between the switching elements T3 and T4 is electrically conductively connected to phase V; and the connection point between the switching elements T5 and T6 is electrically conductively connected to phase W.

In this embodiment, the switching elements T1, T3 and T5 form a first switching unit, i.e., an upper bridge arm of the bridge inverter; and the switching elements T2, T4 and T6 form a second switching unit, i.e., a lower bridge arm of the bridge inverter. The switching elements T1 to T6 may each be implemented to comprise a power transistor and a diode connected in parallel thereto.

The control unit 22 generates a control signal for controlling switching states of the respective switching elements. For example, the control unit 22 generates control signals X1 to X6 for respectively controlling the switching states (on and off) of the switching elements T1 to T6, and outputs the control signals X1 to X6 to control terminals of the switching elements T1 to T6 respectively.

In an embodiment, the control unit 22 may be disposed in a microcontroller of a driving control system of the electric motor 10. The driving control system may comprise the above driving circuit and the microcontroller.

The control unit 22 may be implemented by means of hardware or software or a combination of software and hardware. For a part implemented by hardware, it may be implemented in one or more application-specific integrated circuits (ASICs), digital signal processors (DSPs), data signal processing devices (DSPDs), programmable logic devices (PLDs), field-programmable gate arrays (FPGAs), processors, controllers, microcontrollers, microprocessors, electronic units designed to perform functions thereof, or combinations thereof. For a part implemented by software, it may be implemented by means of microcodes, program codes or code segments, and they may also be stored in a machine-readable storage medium such as a memory component.

In an embodiment, the control unit 22 is implemented to comprise a memory and a processor. The memory includes instructions which, when executed by the processor, cause the processor to execute brake control logic/a brake control method according to an embodiment of the present disclosure.

The control unit 22 can generate control signals X1 to X6 for respectively controlling the switching elements T1 to T6, and different combinations of the control signals X1 to X6 can realise different brake modes of the three-phase motor 10. For example, first to third control signals are used to implement first to third brake modes, respectively. For example, a control signal may be implemented to have a high level and a low level, and a switching element is turned on under the control of the high-level control signal, and turned off under the control of the low-level control signal. Certainly, the corresponding relationship between the control signal and the switching state may also be in other manners, and is not limited thereto.

These control signals and brake modes will be described below with reference to FIG. 3.

First of all, it should be noted that, in an embodiment of the present disclosure, one electrical period is divided into 6 sub-periods each having a duration of T/6 (see intervals divided by the dotted lines in FIG. 3), that is, each sub-period of an electrical period (0 to 360°) corresponds to an interval of 60°. In other words, one electrical period includes the following 6 sub-periods: intervals of 0° to 60°, 60° to 120°, 120° to 180°, 180° to 240°, 240° to 300° and 300° to 360°. In an embodiment, the electrical period of 0° to 360° may be divided into six 60° intervals by means of a signal including the information of the back electromotive force (BEMF) such as a rotor position signal (Hall signal) of the motor.

It can be understood that the time period from the start of braking to the complete stop (stop by braking) of the three-phase motor 10 may include several complete electrical periods, or may include several complete electrical periods and an incomplete electrical period, that is, the last electrical period before the motor stops may be incomplete.

Figure 3:
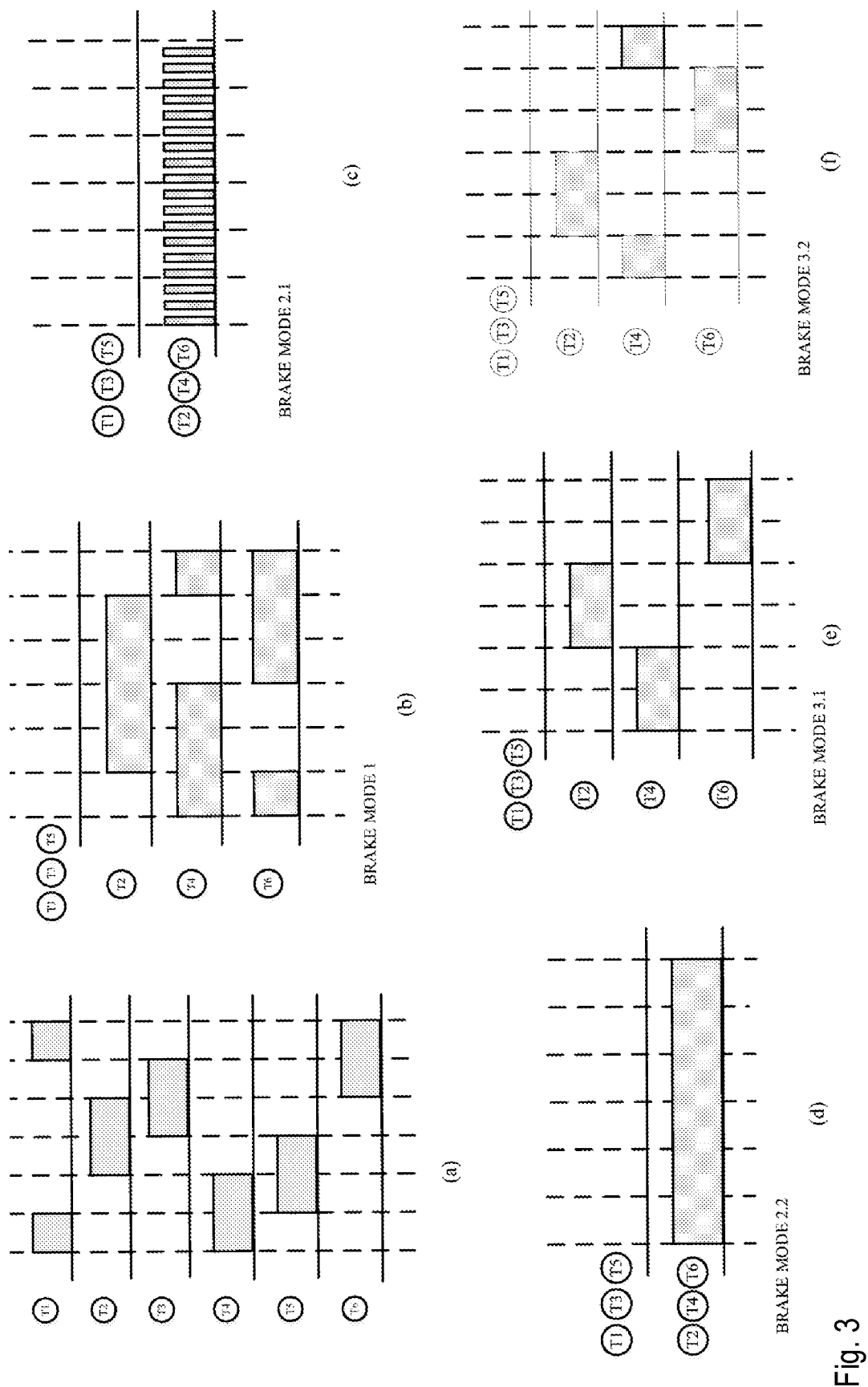
FIG. 3 shows a switching state diagram of each switching element of the control device in FIG. 2 in different brake modes according to an embodiment of the present disclosure.

(a) of FIG. 3 shows a state diagram of the switching elements T1 to T6 in a state where the motor 10 is continuously rotating. The switching state can be understood as a six-step commutation operating state. Specifically, under the control of the control signals X1 to X6, in the interval of 0° to 60°, the switching elements T1 and T4 are turned on (working); in the interval of 60° to 120°, the switching elements T4 and T5 are turned on; in the interval of 120° to 180°, the switching elements T2 and T5 are turned on; in the interval of 180° to 240°, the switching elements T2 and T3 are turned on; in the interval of 240° to 300°, the switching elements T3 and T6 are turned on; and in the interval of 300° to 360°, the switching elements T1 and T6 are turned on. In this way, the phases are sequentially commutated to realise the continuous rotation of the motor 10.

(b) of FIG. 3 shows an embodiment of the switching states of the switching elements T1 to T6 for realising the first brake mode.

In the first brake mode, the respective switching elements are implemented under the control of the first control signal so that: a lower bridge arm switch corresponding to a phase with the maximum back electromotive force during the braking process of the motor is always off, that is, in each sub-period interval, the lower bridge arm switch corresponding to the phase with the maximum back electromotive force is turned off, and the two lower bridge arm switches corresponding to the other two phases are turned off. Therefore, the first brake mode can be understood as a dual down tube brake mode.

Referring to (b) of FIG. 3, one electrical period of 0° to 360° is taken as an example to illustrate on and off logic of the respective switches in the first brake mode.

In the period of 0 to 360°, the respective switching elements of the upper bridge arm, i.e., the switching elements T1, T3 and T5, are turned off (stop working). In the interval of 0° to 60°, the switching elements T4 and T6 are turned on (working), and the switching element T2 is turned off (not working); in the interval of 60° to 120°, the switching elements T2 and T4 are turned on, and the switching element T6 is turned off; in the interval of 120° to 180°, the switching elements T2 and T4 are turned on, and the switching element T6 is turned off; in the interval of 180° to 240°, the switching elements T2 and T6 are turned on, and the switching element T4 is turned off; in the interval of 240° to 300°, the switching elements T2 and T6 are turned on, and the switching element T4 is turned off; and in the interval of 300° to 360°, the switching elements T4 and T6 are turned on, and the switching element T2 is turned off. In this way, the phases are sequentially commutated to realise the continuous braking of the motor 10.

In the first brake mode, the lower bridge arm switch corresponding to the phase with the maximum back electromotive force is always not working. Specifically, in the interval of 0° to 60°, the maximum back electromotive force (BEMF) of phase U is avoided; in the interval of 60° to 120°, the maximum back electromotive force of phase V is avoided; in the interval of 120° to 180°, the maximum back electromotive force of phase V is avoided; in the interval of 180° to 240°, the maximum back electromotive force of phase W is avoided; in the interval of 240° to 300°, the maximum back electromotive force of phase W is avoided; and in the interval of 300° to 360°, the maximum back electromotive force of phase U is avoided.

In the first brake mode, since the upper bridge arm switch is always off (Off) during the braking process, the power supply of the electric tool is isolated from the upper bridge arm switch of the motor 10 that is turned off. A braking current is only caused by the back electromotive force acting on a three-phase winding of the motor, and the maximum back electromotive force in the corresponding sub-period interval is avoided.

(c) and (d) of FIG. 3 each show an embodiment of the switching states of the switching elements T1 to T6 for realising the second brake mode. In the second brake mode, under the control of the second control signal, the respective switching elements of the lower bridge arm are periodically turned on, or are always on.

In an embodiment of the second brake mode, referring to (c) of FIG. 3, one electrical period of 0° to 360° is taken as an example to illustrate on and off logic of the respective switches.

In the period of 0° to 360°, the respective switching elements of the upper bridge arm, i.e., the switching elements T1, T3 and T5, are turned off (stop working). In the period of 0° to 360°, the respective switching elements of the lower bridge arm, i.e., the switching elements T2, T4 and T6 work in a PWM chopping mode. Thus, the second brake mode of this embodiment can be understood as a PWM chopping brake mode. Specifically, under the control of the second control signal, the On and Off states of the switching elements T2, T4 and T6 alternately occur. During the On state of the switching elements T2, T4 and T6, a braking current is caused by the back electromotive force acting on the three-phase winding of the motor. During the Off state of the switching elements T2, T4 and T6, a three-phase winding current is fed back to a DC side through reverse freewheeling diodes of the switching elements T1, T3 and T5, causing a DC side voltage to rise.

In another embodiment of the second brake mode, referring to (d) of FIG. 3, one electrical period of 0° to 360° is taken as an example to illustrate on and off logic of the respective switches.

Under the control of the second control signal, in the period of 0° to 360°, the respective switching elements of the upper bridge arm, i.e., switching elements T1, T3 and T5, are turned off (stop working). In the period of 0° to 360°, the respective switching elements of the lower bridge arm, i.e., the switching elements T2, T4 and T6, are always on (working), and the three-phase electromotive force acts on the three-phase winding of the motor to generate a braking current. In this case, the braking current is the largest and the braking speed is the fastest, but there is a risk of burning the power switching device due to excessive braking current. Therefore, the second brake mode in this embodiment can be understood as the maximum braking current mode.

(e) and (f) of FIG. 3 each show an embodiment of the switching states of the switching elements T1 to T6 for realising the third brake mode. In the third brake mode, each switching element of the lower bridge arm is turned on sequentially, and thus, the third brake mode can be understood as a single lower tube brake mode.

In an embodiment of the third brake mode, referring to (e) of FIG. 3, one electrical period of 0° to 360° is taken as an example to illustrate on and off logic of the respective switches.

Under the control of the third control signal, in the period of 0° to 360°, the respective switching elements of the upper bridge arm, i.e., the switching elements T1, T3 and T5, are turned off (stop working). In the period of 0° to 360°, the on state and sequence of the respective switching elements of the lower bridge arm, i.e., the switching elements T2, T4 and T6, are the same as when the motor is operating normally (that is, they are the same as the state shown in FIG. 3(a)). Specifically, in the interval of 0° to 120°, the switching element T4 is turned on (working); in the interval of 120° to 240°, the switching element T2 is turned on; and in the interval of 240° to 360°, the switching element T6 is turned on. In this embodiment, the on state and sequence of the switching elements of the lower bridge arm are the same as in normal operation. Since the switching elements of the upper bridge arm are turned off (not working), the motor is in a free stop state, and the three-phase back electromotive force of the winding does not generate a braking current.

In another embodiment of the third brake mode, see (f) of FIG. 3, this embodiment is different from the above embodiment of the third brake mode in that the control unit 22 sets a leading conduction angle for each switching element of the lower bridge arm, wherein the leading conduction angle is in a range between 0° to 60°, for example, greater than 0° and less than or equal to 60°. After the leading conduction angle is set, the three-phase electromotive force of the winding acts on the winding through the switching elements of the lower bridge arm in the leading conduction interval to generate a braking current. Since the leading conduction angle is in the range of 0° to 60°, it can be ensured that before the arrival of the next commutation state, it will return to the equivalent state of the above embodiment (the embodiment in FIG. 3(e)). At this time, the three-phase electromotive force of the winding does not generate a braking current, thereby ensuring that the winding current will not be fed back to the power supply of the electric tool through the reverse freewheeling diodes of the switching elements of the upper bridge arm during commutation.

Referring to (f) of FIG. 3, one electrical period of 0° to 360° is taken as an example to illustrate on and off logic of the respective switches.

The leading conduction angle is set to 60 degrees. Under the control of the third control signal, in the period of 0° to 360°, the respective switching elements of the upper bridge arm, i.e., the switching elements T1, T3 and T5, are turned off (stop working). In the interval of 0° to 60°, the switching element T4 is turned on (working); in the interval of 60° to 180°, the switching element T2 is turned on; in the interval of 180° to 300°, the switching element T6 is turned on; and in the interval of 300° to 360°, the switching element T4 is turned on.

According to an embodiment of the present disclosure, the control unit 22 can determine one or more of the above brake modes to be used on the basis of a braking requirement of the motor in a practical application, and determine an execution duration and execution sequence of the used brake mode.

The braking requirement of the motor may include the following aspects: (1) Return bus current. For example, a return current to the power supply/battery side of the electric tool during braking cannot exceed a predetermined threshold (for example, the return bus current is monitored and detected). (2) Braking current. For example, the braking current cannot be less than a predetermined threshold (for example, a return phase line current is detected). (3) Braking duration. For example, the braking duration should not be too long.

Figure 4:
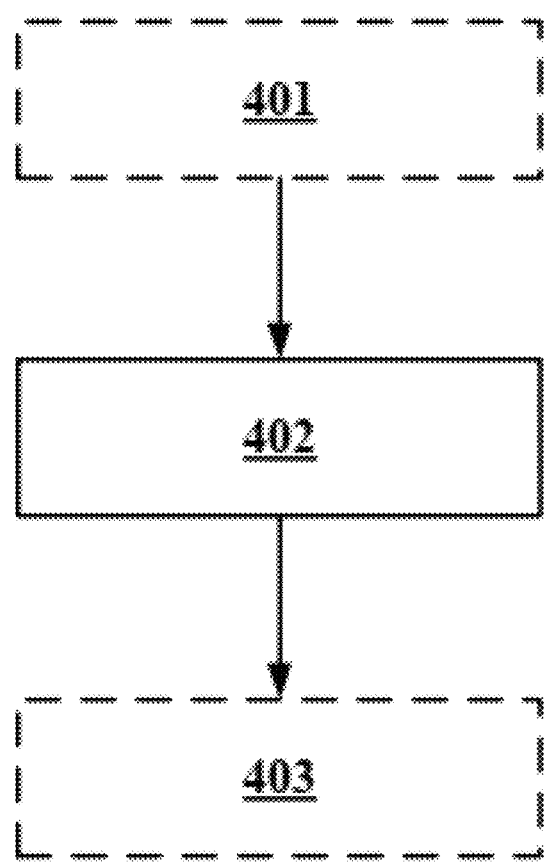
FIG. 4 shows a flowchart of a control method according to a feasible implementation of the present disclosure.

A control method according to an embodiment of the present disclosure will be described below with reference to FIG. 4. The control method may be executed in the above control device 20, for example, by the above control unit 22. Therefore, the above descriptions are also applicable here, and will not be repeated here.

In an embodiment, in block 402, the control unit 22 generates a first control signal for controlling the switching states of the respective switching elements, so as to realise the first brake mode of the three-phase motor 10, wherein under the control of the first control signal, the respective switching elements of the first switching unit are turned off, and in each sub-period interval of one electrical period, the switching element in the second switching unit corresponding to a phase with the maximum back electromotive force of the three-phase motor is turned off, and the other switching elements of the second switching unit are turned on.

In this embodiment, each electrical period comprises six equal sub-periods, and in each electrical period in the first brake mode, under the control of the first control signal: in the first and sixth sub-period intervals, the switching element in the second switching unit corresponding to phase U is turned off, and the switching elements in the second switching unit corresponding to phases V and W are turned on; in the second and third sub-period intervals, the switching element in the second switching unit corresponding to phase V is turned off, and the switching elements in the second switching unit corresponding to phases U and W are turned on; in the fourth and fifth sub-period intervals, the switching element in the second switching unit corresponding to phase W is turned off, and the switching elements in the second switching unit corresponding to phases U and V are turned on.

In another embodiment, it is desirable that the braking time can be shortened relative to the above embodiments, that is, the motor is stopped by braking faster. It is possible to execute the second brake mode after the first brake mode is executed, that is, it is possible to execute block 403 after block 402, because the braking current in the second brake mode is relatively large. Therefore, the braking time can be shortened.

In this embodiment, one of the above two embodiments of the second brake mode, i.e., one of the PWM chopping brake mode and the maximum braking current mode, may be selectively adopted according to an actual application situation and a requirement for the braking duration.

In this embodiment, during a period from when block 402 (i.e., the first brake mode) is executed for a certain duration so that operating energy of the three-phase motor is consumed by a predetermined percentage (e.g., 60%) (that is, most of the operating energy of the motor has been consumed) until the motor is stopped by braking, a second control signal for controlling the switching states of the respective switching elements is generated so as to realise the second brake mode of the three-phase motor, wherein under the control of the second control signal, the respective switching elements of the first switching unit are turned off, and the respective switching elements of the second switching unit are periodically turned on, or are always on.

In yet another embodiment, it is desirable that the return bus current will not be too large all the time, that is, it is desirable that the energy returned to the battery/power supply of the electric tool is limited to a small range at the initial stage of the motor starting to brake. It is possible to execute the third brake mode before the first brake mode, that is, block 403 is executed before block 402, because the return bus current in the first brake mode is very small (almost zero).

In this embodiment, before the first brake mode is executed, a third control signal for controlling the switching states of the respective switching elements is generated to realise the third brake mode of the three-phase motor, and the first brake mode is executed again after the third brake mode is executed for a certain duration so that the return bus current drops to a predetermined threshold, wherein under the control of the third control signal, the respective switching elements of the first switching unit are turned off, and in each sub-period interval of one electrical period, the switching element in the second switching unit corresponding to one phase of the motor is turned on, and the switching elements in the second switching unit corresponding to the other two phases are turned off.

It can be understood that the braking process that can be implemented is described above only as an example, and the braking process according to the embodiments of the present disclosure may also be implemented in other combinations of the first, second and third brake modes. For example, the third brake mode is executed at the initial stage of the motor starting to brake, the first brake mode is executed when the return bus current is almost zero, and the second brake mode is executed after most of the operating energy of the motor is consumed, so that the motor can stop quickly after most of the operating energy is consumed.

It can be understood that the control device/control method for the three-phase motor according to the embodiments of the present disclosure may also be applied to other equipment or systems that have requirements in terms of both braking efficiency and expecting the return current to the power supply/battery to be almost zero.

The present disclosure also provides a machine-readable storage medium storing executable instructions which, when executed, cause one or more processors to execute the above control method.

It can be understood that although the electric tool 100 illustrated in FIG. 1 may be a machine tool such as a drill or a chisel hammer, the electric tool according to the embodiments of the present disclosure may also be other types of machine tools, for example, other equipment or systems that are suitable for using the control device/method according to the embodiments of the present disclosure.

While some implementations have been described previously, these implementations have been presented by way of example only, and are not intended to limit the scope of the present application. The appended claims and their equivalents are intended to cover all modifications, substitutions and changes made within the scope and spirit of the present application.

What is claimed is:

1. A control device for a three-phase motor used in an electric tool, comprising:
   a switching unit having a first switching unit and a second switching unit, wherein the first switching unit and the second switching unit each comprises a plurality of switching elements corresponding to respective phases of a driving circuit of the three-phase motor, each switching element of the first switching unit is connected in series with a corresponding switching element of the second switching unit, and both are separately electrically connected to one phase of the driving circuit of the three-phase motor; and
   a control unit configured to be electrically connected to the switching unit, and to generate a first control signal for controlling switching states of the respective switching elements so as to realize a first brake mode of the three-phase motor,
   wherein under the control of the first control signal, the respective switching elements of the first switching unit are turned off, and in each sub-period interval of one electrical period, the switching element in the second switching unit corresponding to a phase with a maximum back electromotive force of the three-phase motor is turned off, and the other switching elements in the second switching unit are turned on.

2. A control device according to claim 1, wherein each electrical period comprises six sub-periods, and in each electrical period in the first brake mode, under the control of the first control signal:
   in first and sixth sub-period intervals, the switching element in the second switching unit corresponding to phase U is turned off, and the switching elements in the second switching unit corresponding to phases V and W are turned on;
   in second and third sub-period intervals, the switching element in the second switching unit corresponding to phase V is turned off, and the switching elements in the second switching unit corresponding to phases U and W are turned on; and
   in fourth and fifth sub-period intervals, the switching element in the second switching unit corresponding to phase W is turned off, and the switching elements in the second switching unit corresponding to phases U and V are turned on.

3. A control device according to claim 1, wherein the control unit is further configured to:
   during a period from when the first brake mode is executed for a certain duration so that operating energy of the three-phase motor is consumed by a predetermined percentage until the three-phase motor is stopped by braking, generate a second control signal for controlling the switching states of the respective switching elements so as to realize a second brake mode of the three-phase motor,
   wherein under the control of the second control signal, the respective switching elements of the first switching unit are turned off, and the respective switching elements of the second switching unit are periodically turned on, or are always on.

4. A control device according to claim 1, wherein:
   the control unit is further configured to, before the first brake mode is executed, generate a third control signal for controlling the switching states of the respective switching elements so as to realize a third brake mode of the three-phase motor, and the first brake mode is executed again after the third brake mode is executed for a certain duration so that a return current to a bus is reduced to a predetermined threshold, and
   under the control of the third control signal, the respective switching elements of the first switching unit are turned off, and in each sub-period interval of one electrical period, the switching element in the second switching unit corresponding to one phase of the motor is turned on, and the switching elements in the second switching unit corresponding to the other two phases are turned off.

5. A control device according to claim 4, wherein:
   the control unit is further configured to set a leading conduction angle for a switching element to be turned on in the second switching unit, and
   the leading conduction angle is greater than 0° and less than or equal to 60°.

6. A control device according to claim 1, wherein:
   the control unit is configured to determine one or more of first to third brake modes to be used according to a braking requirement of the three-phase motor in a practical application, and to determine an execution duration and an execution sequence of the used brake mode;
   the braking requirement comprises one or more of a braking current, a return bus current, and a braking duration; and the first brake mode is a dual down tube brake mode, the second brake mode is a maximum braking current mode, and the third brake mode is a single down tube brake mode.

7. A control device according to claim 1, wherein the switching elements of the switching unit form a bridge inverter, and the switching elements of the first switching unit form an upper bridge arm of the bridge inverter, and the switching elements of the second switching unit form a lower bridge arm of the bridge inverter.

8. A control device for a three-phase motor used in an electric tool, comprising:
a switching unit including a first switching unit and a second switching unit, wherein the first switching unit and the second switching unit each comprises a plurality of switching elements corresponding to respective phases of a driving circuit of the three-phase motor, each switching element of the first switching unit is connected in series with a corresponding switching element of the second switching unit, and both are separately electrically connected to one phase of the driving circuit of the three-phase motor; and
a control unit configured to be electrically connected to the switching unit, and to generate a first control signal for controlling switching states of the respective switching elements so as to realize a first braking mode of the three-phase motor,
wherein each electrical period comprises six sub-periods, and in each electrical period in the first brake mode, under the control of the first control signal:
the respective switching elements of the first switching unit are turned off;
in first and sixth sub-period intervals, the switching element in the second switching unit corresponding to phase U is turned off, and the switching elements in the second switching unit corresponding to phases V and W are turned on;
in second and third sub-period intervals, the switching element in the second switching unit corresponding to phase V is turned off, and the switching elements in the second switching unit corresponding to phases U and W are turned on; and
in fourth and fifth sub-period intervals, the switching element in the second switching unit corresponding to phase W is turned off, and the switching elements in the second switching unit corresponding to phases U and V are turned on.

9. A control device according to claim 8, wherein each of the six sub-periods is an interval of 60°.

10. An electric tool, comprising:
a three-phase motor; and
the control device according to claim 1 which is electrically connected to the three-phase motor, and comprises a switching unit and a control unit, wherein the control unit is configured to generate a control signal for controlling respective switching elements of the switching unit so that the three-phase motor realizes one or more of first to third brake modes,
wherein the first brake mode is a dual down tube brake mode, the second brake mode is a maximum braking current mode or a PWM chopping brake mode, and the third brake mode is a single down tube brake mode.

11. A control method for a three-phase motor used in an electric tool, the method being implemented in the control device according to claim 1, wherein:
the electric tool comprises a three-phase motor and a switching unit; the switching unit is electrically connected to the motor to supply a current thereto; the switching unit comprises a first switching unit and a second switching unit; the first switching unit and the second switching unit each comprises a plurality of switching elements corresponding to respective phases of a driving circuit of the three-phase motor; each switching element of the first switching unit is connected in series with a corresponding switching element of the second switching unit, and both are separately electrically connected to one phase of the driving circuit of the three-phase motor, and
the method comprises: generating a first control signal for controlling switching states of the respective switching elements so as to realize a first brake mode of the three-phase motor, wherein under the control of the first control signal, the respective switching elements of the first switching unit are turned off, and in each sub-period interval of one electrical period, the switching element in the second switching unit corresponding to a phase with a maximum back electromotive force of the three-phase motor is turned off, and the other switching elements in the second switching unit are turned on.

12. A control method for a three-phase motor used in an electric tool, the method being implemented in the control device according to claim 8, wherein:
the electric tool comprises a three-phase motor and a switching unit; the switching unit is electrically connected to the motor to supply a current thereto; the switching unit comprise a first switching unit and a second switching unit; the first switching unit and the second switching unit each comprises a plurality of switching elements corresponding to respective phases of a driving circuit of the three-phase motor; each switching element of the first switching unit is connected in series with a corresponding switching element of the second switching unit, and both are separately electrically connected to one phase of the driving circuit of the three-phase motor,
the method comprises: generating a first control signal for controlling switching states of the respective switching elements so as to realize a first brake mode of the three-phase motor, and
each electrical period comprises six sub-periods, and in each electrical period in the first brake mode, under the control of the first control signal:
the respective switching elements of the first switching unit are turned off;
in first and sixth sub-period intervals, the switching element in the second switching unit corresponding to phase U is turned off, and the switching elements in the second switching unit corresponding to phases V and W are turned on;
in second and third sub-period intervals, the switching element in the second switching unit corresponding to phase V is turned off, and the switching elements in the second switching unit corresponding to phases U and W are turned on; and
in fourth and fifth sub-period intervals, the switching element in the second switching unit corresponding to phase W is turned off, and the switching elements in the second switching unit corresponding to phases U and V are turned on.

13. A control device according to claim 2, wherein each of the six sub-periods is an interval of 60°.

* * * * *